United States Patent
Tu et al.

(10) Patent No.: US 8,238,017 B2
(45) Date of Patent: Aug. 7, 2012

(54) PHOTONIC MATCH FILTER

(75) Inventors: Kun-Yii Tu, Califon, NJ (US);
Ting-Chen Hu, Edison, NJ (US);
Young-Kai Chen, Berkley Heights, NJ (US)

(73) Assignee: Alcatel Lucent, Paris (FR)

( * ) Notice: Subject to any disclaimer, the term of this patent is extended or adjusted under 35 U.S.C. 154(b) by 283 days.

(21) Appl. No.: 12/641,601

(22) Filed: Dec. 18, 2009

(65) Prior Publication Data
US 2011/0149369 A1    Jun. 23, 2011

(51) Int. Cl.
*G02F 1/01*    (2006.01)
(52) U.S. Cl. ........ 359/279; 359/245; 342/367; 342/375; 327/105; 341/111
(58) Field of Classification Search .......... 359/245, 359/279; 342/367, 371, 372, 375; 333/105, 333/117, 156, 158, 161, 164; 343/754, 756; 385/1, 37; 398/198
See application file for complete search history.

(56) References Cited

U.S. PATENT DOCUMENTS

| | | | | |
|---|---|---|---|---|
| 3,453,623 A * | 7/1969 | Blackband et al. | ........... | 342/367 |
| 3,581,241 A * | 5/1971 | Schilliger | ............ | 332/172 |
| 3,819,958 A * | 6/1974 | Gosney | ............ | 327/271 |
| 4,218,752 A * | 8/1980 | Hewes et al. | ............ | 708/819 |
| 4,288,785 A * | 9/1981 | Papuchon et al. | ............ | 341/111 |
| 4,458,219 A * | 7/1984 | Vorhaus | ............ | 333/164 |
| 4,502,037 A * | 2/1985 | Le Parquier et al. | ............ | 341/111 |
| 4,602,228 A * | 7/1986 | Yamada | ............ | 333/194 |
| 4,628,378 A * | 12/1986 | Takayama | ............ | 360/77.01 |
| 4,837,532 A * | 6/1989 | Lang | ............ | 333/164 |
| 5,168,250 A * | 12/1992 | Bingham | ............ | 333/139 |
| 5,337,027 A * | 8/1994 | Namordi et al. | ............ | 333/161 |
| 6,594,421 B1 | 7/2003 | Johnson et al. | | |
| 6,842,061 B2 * | 1/2005 | Suda et al. | ............ | 327/291 |
| 7,068,220 B2 * | 6/2006 | DeNatale et al. | ............ | 342/375 |
| 7,402,821 B2 * | 7/2008 | Bernhardt | ............ | 250/492.21 |
| 7,925,171 B2 * | 4/2011 | Ooi et al. | ............ | 398/198 |
| 7,961,769 B2 * | 6/2011 | Fujiwara et al. | ............ | 372/50.121 |
| 2003/0063364 A1 | 4/2003 | Kambe | | |
| 2007/0212077 A1 | 9/2007 | Yasue et al. | | |
| 2007/0280704 A1 | 12/2007 | Fitzgerald et al. | | |
| 2008/0037608 A1 | 2/2008 | Zhou et al. | | |

FOREIGN PATENT DOCUMENTS

| | | |
|---|---|---|
| EP | 0836225 A1 | 4/1998 |
| EP | 2113973 A1 | 4/2009 |
| GB | 2347230 A | 8/2000 |
| JP | 8111561 A1 | 4/1996 |

OTHER PUBLICATIONS

Clark, Thomas, et al.; "DSP-Based Highly Linear Microwave Photonic Link"; Microwave Symposium, 2007, IEEE, vol. Issue 3-8 Jun. 2007, pp. 1507-1510.

Minakata, Makoto; "Recent Progress of 40 GHz high-speed LiNbO3 optical modulator"; vol. 4532, 2001 SPIE; pp. 16-27.

(Continued)

*Primary Examiner* — Loha Ben
(74) *Attorney, Agent, or Firm* — Hitt Gaines, PC

(57) ABSTRACT

An optical path is configured to propagate an input optical signal. A plurality of electrodes are configured to produce a plurality of discrete phase shifts on the optical signal. An output optical signal is phase-shifted with respect to the input optical signal by a sum of the plurality of discrete phase shifts.

21 Claims, 6 Drawing Sheets

OTHER PUBLICATIONS

Li, W., et al., "Multiwavelength Gain-Coupled DFB Laser Cascade: Design Modeling and Simulation", 2000 IEEE Journal of Quantum Electronics, vol. 36, No. 10, Oct. 2000, pp. 1110-1116.

Al-Mumin, et al., "Injection locked multi-section gain-coupled dual mode DFB laser for terahertz generation", Optics Communications 275, (2007), pp. 186-189.

Duan, G.H., et al., "Injection-locking properties of self pulsation in semiconductor lasers", IEEE Proceedings-Optoelectronics, vol. 144, No. 4, Aug. 1997, pp. 228-234.

Sung, Hyuk Lee, et al., "Optical Generation of Millimeter-waves using Monolithic Sideband Injection Locking of a Two-section DFB Laser", 2003 IEEE, pp. 1005-1006.

* cited by examiner

PHOTONIC MATCH FILTER

TECHNICAL FIELD

This application is directed, in general, to optical devices, and more specifically but not exclusively to photonic devices.

BACKGROUND

This section introduces aspects that may be helpful in facilitating a better understanding of the disclosure. Accordingly, the statements of this section are to be read in this light and are not to be understood as admissions about what is in the prior art or what is not in the prior art.

Matched filters are used in various applications, including radar and telecommunications. A matched filter typically correlates a known signal, or template, with an unknown signal to detect the presence of the template in the unknown signal.

Typically, matched filters operate by amplitude matching. However, inherent limitations to amplitude matching may limit performance of a system including the matched filter.

SUMMARY

One aspect provides an apparatus that includes an optical path and a plurality of electrodes. The optical path is configured to propagate an input optical signal. The plurality of electrodes are configured to produce a plurality of discrete phase shifts on the optical signal. An output optical signal is phase-shifted with respect to the input optical signal by a sum of the plurality of discrete phase shifts.

Another aspect provides a photonic matched filter. The filter includes first and a second optical arbitrary phase waveform generators, and a propagation path therebetween. The first optical arbitrary phase waveform generator is adapted to accept a coherent light signal and apply a first temporal phase shift pattern thereto. The second optical arbitrary phase waveform generator is configurable to receive an output signal of the first optical arbitrary phase waveform generator and apply a second temporal phase shift pattern thereto. The propagation path is configured to propagate the coherent light signal from an output of the first waveform generator to an input of the second waveform generator.

Yet another aspect is a method. The method includes configuring an optical path to receive a coherent optical signal. A first plurality of electrodes are configured to produce a first plurality of discrete phase shifts on the coherent signal. An output optical signal is phase-shifted with respect to the input optical signal by a sum of the plurality of discrete phase shifts. A first phase sequence generator is configured to control the first plurality of electrodes to produce a first temporal phase shift pattern on the coherent optical signal.

BRIEF DESCRIPTION

Reference is now made to the following descriptions of embodiments, provided as examples only, taken in conjunction with the accompanying drawings, in which.

DETAILED DESCRIPTION

This disclosure benefits from the unique recognition that a matched filter may be implemented using an optical phase-forming device to overcome limitations of conventional matched-filter devices. Optical amplitude-matched filters may be limited by a low extinction ratio due to inherent limitations on signal isolation therein. Phase-matched filters described in various embodiments herein improve on the conventional optical amplitude-matched filter at least in that the extinction ratio limitation on filter performance is substantially reduced or essentially eliminated. This reduction makes possible, among other aspects, a higher signal-to-noise ratio (SNR) of the phase-matched filter than for conventional optical amplitude-matched filter.

Figure 1:
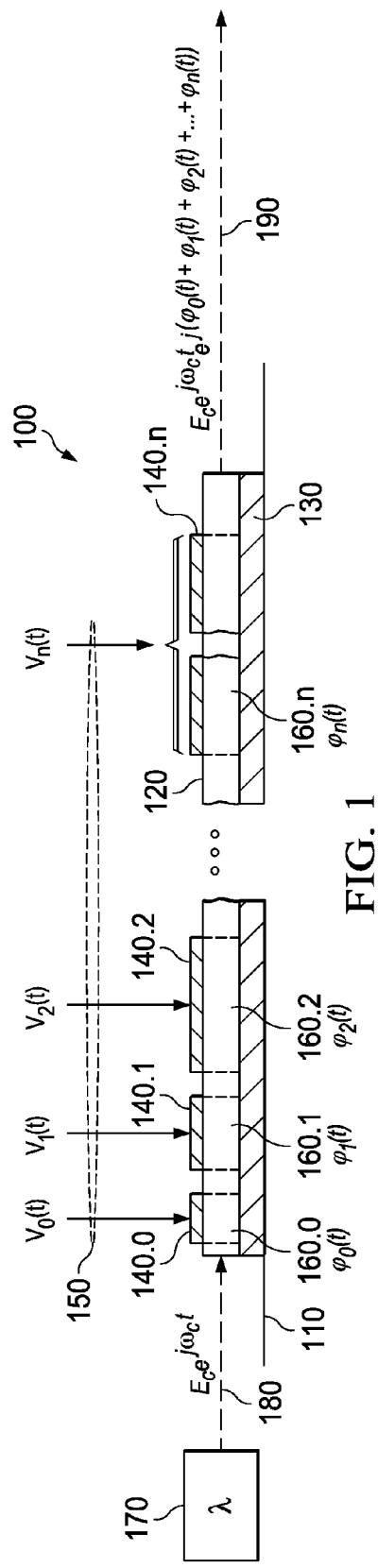
FIG. 1 illustrates a general arbitrary phase waveform generator (APWG) of the disclosure.

Turning initially to FIG. 1, illustrated is a generalized embodiment of an arbitrary phase waveform generator (APWG), generally designated 100. The APWG 100 is illustrated without limitation as a planar optical waveguide device formed on a substrate 110. Embodiments utilizing other forms of optical waveguide, such as fiber waveguide, are within the capability of those skilled in the optical arts given the present disclosure. An optical path 120 is formed over the substrate 110, with an electrode 130 located therebetween. Electrodes 140.0, 140.1, 140.2 ... 140.n, collectively referred to herein as electrodes 140, are located over the optical path 120. The electrodes are controlled by control signals $V_0(t)$, $V_1(t)$, $V_2(t)$, ... $V_n(t)$, collectively referred to as control signals 150. Each of the substrate 110, optical path 120, electrode 130 and electrodes 140 may be conventional or formed by any future-discovered process. The optical path may include, e.g., lithium niobate ($LiNbO_3$) or other electro-optic material capable of inducing a phase shift on an optical signal passing therethrough in response to a voltage between one or more of the electrodes 140 and the electrode 130.

Each electrode 140 is associated with a corresponding phase modulation section 160. Thus, for example, the electrode 140.0 is associated with a phase modulation section 160.0, the electrode 140.1 is associated with a phase modulation section 160.1, and so on. Each electrode 140 is also associated with a corresponding incremental phase shift, $\phi_n(t)$. Thus, the electrode 140.0 is associated with a phase shift $\phi_0(t)$, the electrode 140.1 is associated with a phase shift $\phi_1(t)$, and so on. The phase shifts are generally a function of time, reflecting the modulation thereof by the corresponding electrode 140. Hereinafter the time dependence of the phase shift $\phi_n$ is omitted, while it is understood that each phase shift $\phi_n$ is generally a function of time.

A light source 170 is adapted to produce an input optical signal 180. The light source 170 may be, e.g., a visible or invisible coherent optical source such as a laser diode. The light source 170 generally outputs a signal of the form $E_c e^{j\omega_c t}$, having a nearly constant magnitude $E_c$ and a frequency $\omega_c$.

In various embodiments the phase shifts $\phi_0, \phi_1, \phi_2, \ldots \phi_n$ are discrete phase shifts. The phase shifts are discrete in the sense that each electrode 140 is configurable to produce the phase shift $\phi_n$ associated therewith independently of a phase shift produced by another electrode 140. In various embodiments, the magnitude of the phase shifts are also unique, meaning that no two phase shifts $\phi_0, \delta\phi_1, \delta\phi_2 \ldots \delta\phi_n$ are equal. As described further below, the phase of the input optical signal 180 is shifted by a total phase shift that is a sum of the plurality of discrete phase shifts to produce an output optical signal 190.

Without limitation by theory, in general when a voltage is applied between an electrode 140 and the electrode 130, the index of refraction of the phase modulation section 160 associated with that electrode 140 will change, thus changing the optical path length of that phase modulation section 160. The change of optical path length is expected to cause a corresponding change of the phase of the input optical signal 180 passing through the phase modulation section 160. The input optical signal 180 experiences an incremental phase shift associated with each energized electrode 140.

The phase shift produced on the input optical signal 180 may be expressed generally as $e^{j\Phi(t)}$, and is about the sum of the incremental phase shifts produced by each of the phase modulation sections 160. If control signals 150, e.g. $V_0(t)$, $V_1(t), V_2(t) \ldots V_n(t)$, are modulated as a function of time, then $e^{j\Phi(t)}$ will also be time-dependent. For notational convenience the control signals 150 may be designated $b_0, b_1, b_2, \ldots b_n$. In some embodiments the control signals 150 are controlled in binary manner. Herein, a binary manner with respect to a control line means the control line is switched during normal operation between two states. A first state, corresponding to a logical "0" or Boolean "false", may correspond to control of the associated modulation section 160 such that no phase shift occurs therein. A second state, corresponding to a logical "1" or Boolean "true", may correspond to control of the associated modulation section 160 such that a predetermined non-zero phase shift occurs therein. Of course, the assignment of logical states to voltage states of the electrodes 140 is arbitrary, and may be reversed. A total phase shift imposed by the APWG 100 on the input optical signal 180 may be represented as $e^{jb_0\phi_0}e^{jb_1\phi_1}e^{jb_2\phi_2} \ldots e^{jb_n\phi_n}=e^{j(b_0\phi_0+b_1\phi_1+b_2\phi_2+ \ldots +b_n\phi_n)}$, where $\phi_0, \phi_1, \phi_2, \ldots \phi_n$ are the respective incremental phase shifts produced by the bits $b_0, b_1, b_2, \ldots b_n$, and $b_0\phi_0+b_1\phi_1+b_2\phi_2+ \ldots +b_n\phi_n$ is a total phase shift due to the modulation sections 160 associated with the active electrodes 140.

Various embodiments presented herein may describe the electrodes 140 as having a particular relationship of lengths relative to one another. The APWG 100, for instance, is shown with the electrode 140.2 being longer than the electrode 140.1, the electrode 140.3 being longer than the electrode 140.2, and so on, with the electrode 140.n being the longest electrode. While the electrodes 140 are illustrated as increasing in length monotonically in the direction of signal propagation, other configurations are possible and contemplated, including the electrodes 140 being ordered such that they become smaller in the direction of propagation, or even the electrode lengths being unordered. The order of the electrodes 140 in the direction of signal propagation is expected to be unimportant to the operation of the APWG 100.

In an embodiment, the lengths of the electrodes 140 increase in a logarithmic fashion, such that, for example, a ratio of the length of the electrode 140.2 to the length of the electrode 140.1 is about the same as the ratio of the electrode 140.3 to the electrode 140.2. More specifically, in the illustrated embodiment of the APWG 100, ratio of the length of the electrode 140.2 to that of the electrode 140.1 is about 2, the ratio of the length of the electrode 140.3 to that of the electrode 140.2 is about 2, and so on. This embodiment is referred to herein as a binary electrode sequence.

When the electrodes 140 are configured with the binary electrode sequence illustrated for the APWG 100, a phase shift produced by an electrode 140, e.g., the electrode 140.2, relative to a next smaller electrode 140, e.g., the electrode 140.1, also has a ratio of about 2 when $|V_2(t)| \approx |V_1(t)|$. Thus, the ratio of the phase shift produced by each modulation section 160, e.g., the modulation section 160.2, to the phase shift produced by the next shorter modulator section, e.g. the modulation section 160.1, is about 2 when the electrodes are driven digitally.

While the APWG 100 is illustrated having a binary electrode sequence, other electrode configurations are within the scope of the disclosure. For example, the electrodes 140 may have a logarithmic progression other than binary, e.g., any desired ratio that is consistent with device material and processing constraints. In some cases the length of the electrodes 140, and the accompanying phase shift produced thereby, may differ by a relationship other than a logarithmic relationship. In some embodiments, e.g., the length of the electrodes 140 may increase linearly. In other embodiments, the electrodes 140 have a length such that only a single electrode 140 need be energized to produce each desired phase shift value. The length of electrodes may be adjusted, e.g. by laser trimming, when precision of the phase-shift ratio is desired.

Figure 2:
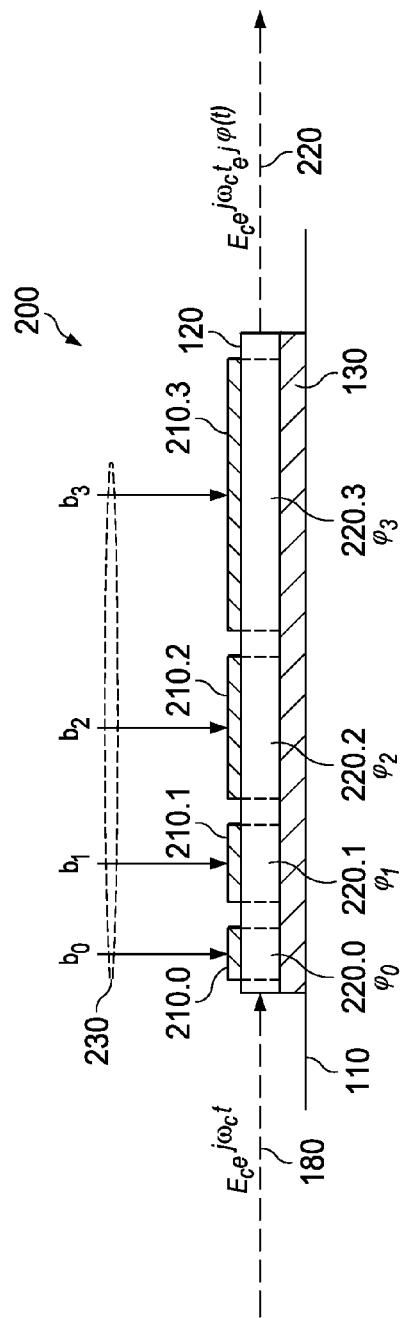
FIG. 2 illustrates an example embodiment of an APWG configured to produce 16 phase states.

FIG. 2 illustrates an embodiment of an APWG 200 that has four electrodes 210.1, 210.2, 210.3, 210.4, referred to collectively as electrodes 210. The electrodes 210 are configured to control the phase of the input optical signal 180 through the optical path 120 to produce an output optical signal 220. The electrodes 210 are controlled by four respective control signals 230. In the illustrated embodiment, the control signals 230 are taken to be binary control lines, and the electrodes 210 are configured in a binary electrode sequence. In the discussion of the APWG, the control lines 230 may be referred to collectively as B and individually as $b_0, b_1, b_2, b_3$ to reflect their status in various embodiments as bits of a control word configured to set $e^{j\Phi(t)}$ to a desired value.

In various embodiments the APWG 100 is configured to produce a total phase shift $\phi_T$ less than $2\pi$. For example, if the control signals 230 ($b_0, b_1, b_2$, and $b_3$) are each configured to have two states then the APWG 200 may provide $2^4=16$ unique phase shifts. The phase delay provided by the APWG 200 may be expressed as $$e^{\frac{\pi}{8}B},$$

in some cases ranging from about 0 radian to about $$\frac{15}{8}\pi.$$

Those skilled in the pertinent art will appreciate the principle illustrated by FIG. 2 may be extended to greater or fewer than four control lines. In some embodiments, the control signals 150 of the APWG 100 include at least six control lines. In principle the number of bits can be extended to an arbitrarily high number within overall design constraints such as device size and complexity. In general, a greater number of control bits results in a greater precision of the total phase shift produced on the input optical signal 180

Figure 3:
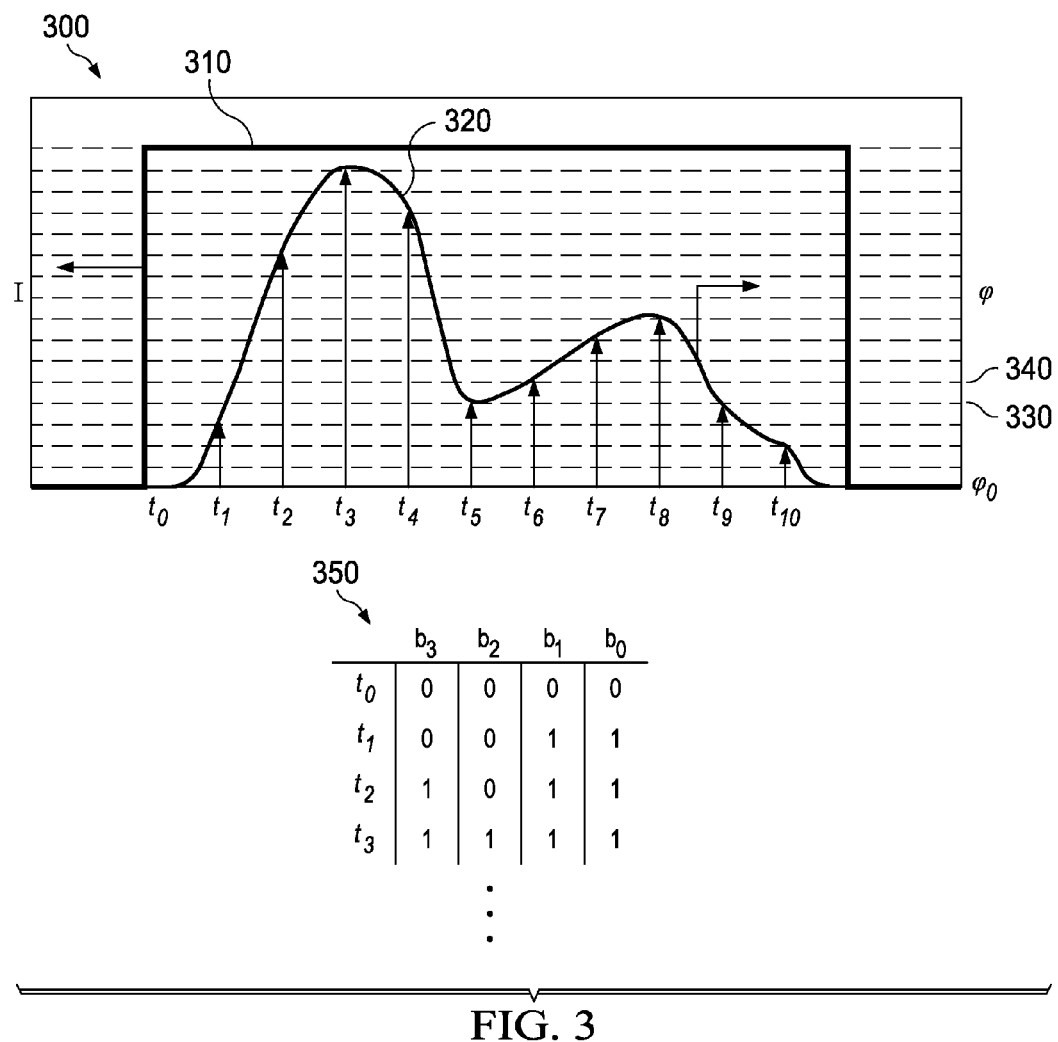
FIG. 3 illustrates an example magnitude and phase of a signal produced by an APWG.

FIG. 3 illustrates an example phase/magnitude characteristic of a temporal phase shift pattern 300, sometimes referred to herein for brevity as a pattern 300. The pattern 300 is described by a magnitude characteristic 310 and a phase characteristic 320. The magnitude characteristic 310 is illustrated for the case of an optional embodiment in which the light source 170 is pulsed. In various alternate embodiments the light source 170 is CW (continuous wave), at least with respect to an interval between two patterns 300. The phase characteristic 320 is illustrated for the case of the output optical signal 220, e.g. the case that the input optical signal 180 is modulated by a set of four unique phase shift quanta. A phase shift quantum is a difference between two adjacent phase shift values, for example between a phase shift value 330 and a phase shift value 340. The phase characteristic 320 is illustrated for the nonlimiting case that the output optical signal 220 initially has a baseline phase $\phi_0$, which in general is arbitrary with respect to the phase of the input optical signal 180.

Bit combinations of the control signals 230, e.g., corresponding to the illustrated states of the phase characteristic 320, are shown in a table 350 for the first three phase states corresponding to times $t_1$, $t_2$, $t_3$. At time $t_1$, the phase of the output optical signal 220 is about $$\varphi_o + \frac{3}{8}\pi.$$

At time $t_2$, the phase of the output optical signal 220 is about $$\varphi_o + \frac{11}{8}\pi.$$

At time $t_3$, the phase of the output optical signal 220 is about $$\varphi_o + \frac{15}{8}\pi.$$

The pattern 300 is illustrated having ten phase states associated therewith, though in principle the pattern 300 may have an arbitrarily large number of associated phase states.

It is noted that the APWG 100 may be configured to result in any desired baseline phase $\phi_o$ of the output optical signal 190. For instance, the length of various optical paths may be controlled to result in a particular value of $\phi_o$. The particular $\phi_o$ may be related, e.g., to requirements of a receiving device. Also, in some embodiments the control of the APWG 100 is biased to produce a desired phase range about the baseline phase. For example, the control signals 150 may be biased to produce about a ±π phase shift about the baseline phase, which may be desirable in various embodiments, such as matched filters.

It is expected that each phase modulation section 160 of the APWG 100 may be driven at a frequency of greater than 20 Gbits/s. In some embodiments each modulation section 160 may be driven at a frequency of 50 Gbits/s or greater. Thus, the APWG 100 is expected to be capable of operating at a very high sampling rate. Moreover, matched filter embodiments using the APWG 100, such as those described below, are expected to provide significantly improved SNR relative to the conventional optical amplitude-matched filters previously described. For example, an amplitude-matched filter may have an extinction ratio less than about 25 dB, which may severely limit the system dynamic range, sometimes expressed as spurious-free dynamic range (SFDR). In contrast, SFDR measurements of the extinction ratio of APWG embodiments consistent with the APWG 100 can provide values in excess of 100 dB, and in some cases exceeding 110 dB, because the extinction ratio is greater due to the direct phase modulation. Therefore, some embodiments using the disclosed APWG 100 are expected to benefit from significantly greater resolution, SFDR and/or SNR than applications using an amplitude-matched filter design. Furthermore, in some cases the high modulation rate and high SNR of some such embodiments may be achieved at significantly lower cost than for conventional phase-modulation devices based on electrical amplitude modulation.

Figure 4:
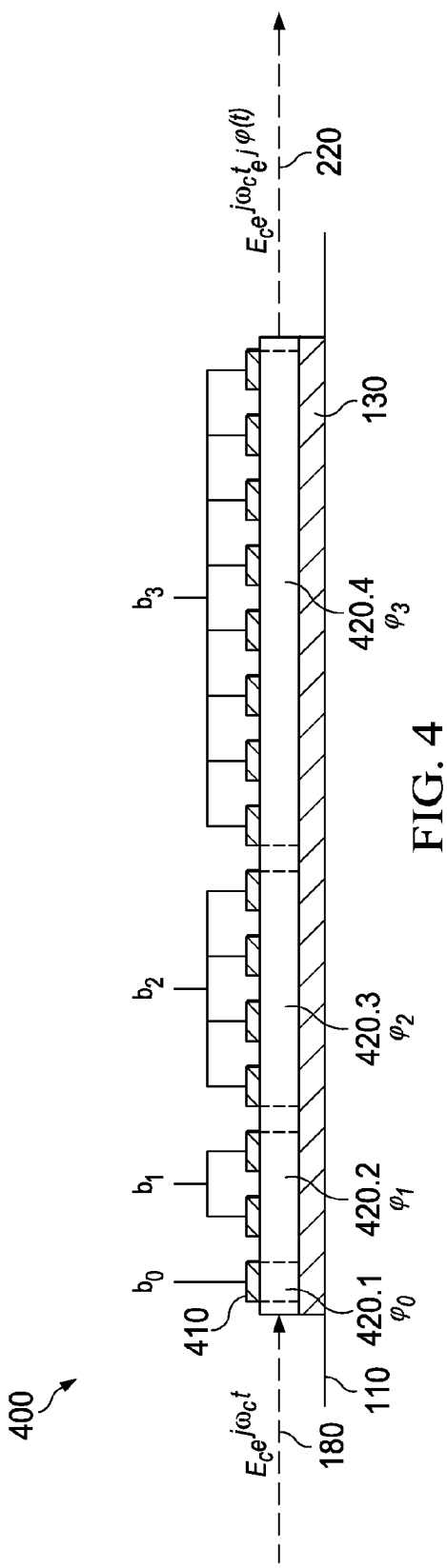
FIGS. 4 and 5 illustrate alternate embodiments of an APWG of the disclosure.

Various alternate embodiments may be used to produce optical path portions having unique optical path lengths. FIG. 4 illustrates one alternate embodiment generally designated 400 in which bits $b_0$, $b_1$, $b_2$, $b_3$ are each coupled to one or more electrodes 410 to result in four phase modulation sections 420.0, 420.1, 420.2, 420.3 having a binary sequence of path lengths. The electrodes 410 are nominally identical in the illustrated embodiment. Thus, when the bits $b_1$ and $b_0$ provide about a same voltage to their respective electrodes, the bit $b_1$, which applies a control voltage to two electrodes 410, produces a phase shift on the input optical signal 180 about twice that of bit $b_0$, which controls the voltage of only a single electrode 410. Similarly, the bit $b_2$ controls the voltage of four electrodes 410, and the bit $b_3$ controls the voltage of eight electrodes 410.

Figure 5:
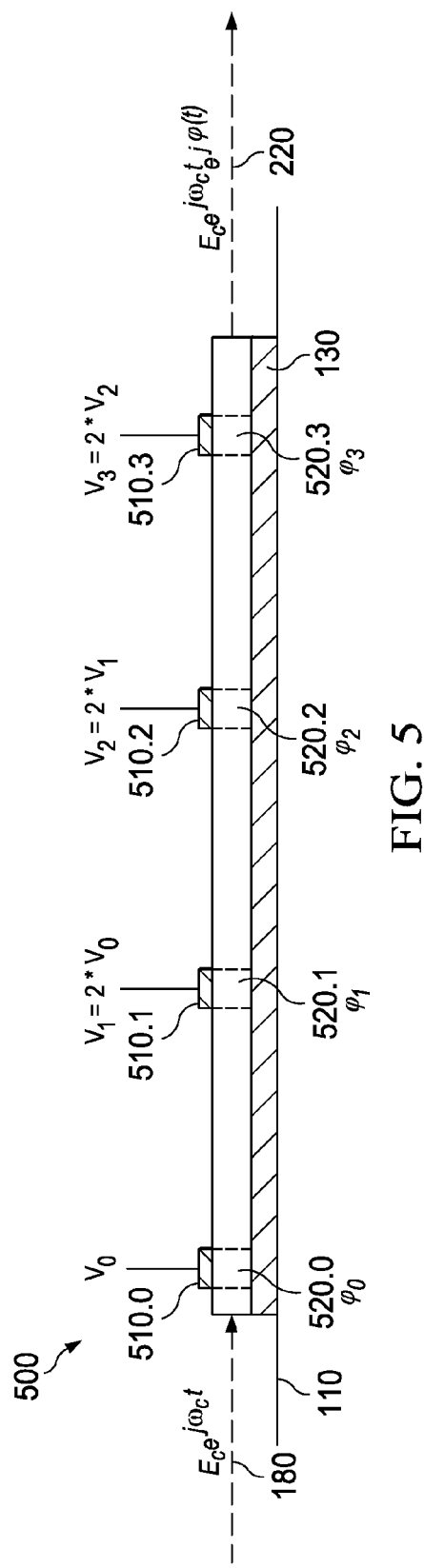

FIG. 5 illustrates an embodiment generally designated 500 in which four nominally identical electrodes 510.0, 510.1, 510.2, 510.3, collectively electrodes 510, are used to produce a phase shift within respective phase modulation sections 520.0, 520.1, 520.2, 520.3, collectively phase modulation sections 520. In the embodiment 500 the voltages applied to electrodes 510 are not equal. In the illustrated embodiment, the physical lengths of the phase modulation sections 520 are about equal, but embodiments are contemplated having unequal path lengths. The electrode 510.0 is controlled by a voltage $V_0$. The electrode 510.1 is controlled by a voltage $V_1$, which is about two times $V_0$. Similarly, the electrode 510.2 is controlled by a voltage $V_2$ that is about two times $V_1$, and the electrode 510.3 is controlled by a voltage $V_3$ that is about two times $V_2$. Thus configured, while the applied voltages remain in a linear response regime of the phase modulation sections 520 the sum of the phase shifts produced by the electrodes 510 and phase modulation sections 520 will generally be proportional to the value of a binary word that describes the pattern of energized electrodes 510.

Those skilled in the pertinent arts will appreciate that by applying the described principles various combinations of control voltages, electrode sizes, and number of electrodes per control line may be used to produce a desired combination of phase shift values to produce any desired phase-form of the output optical signal 190 of a general APWG described by the APWG 100, with in the constraints imposed by material choices, device geometry and number of control bits, e.g.

Figure 6:
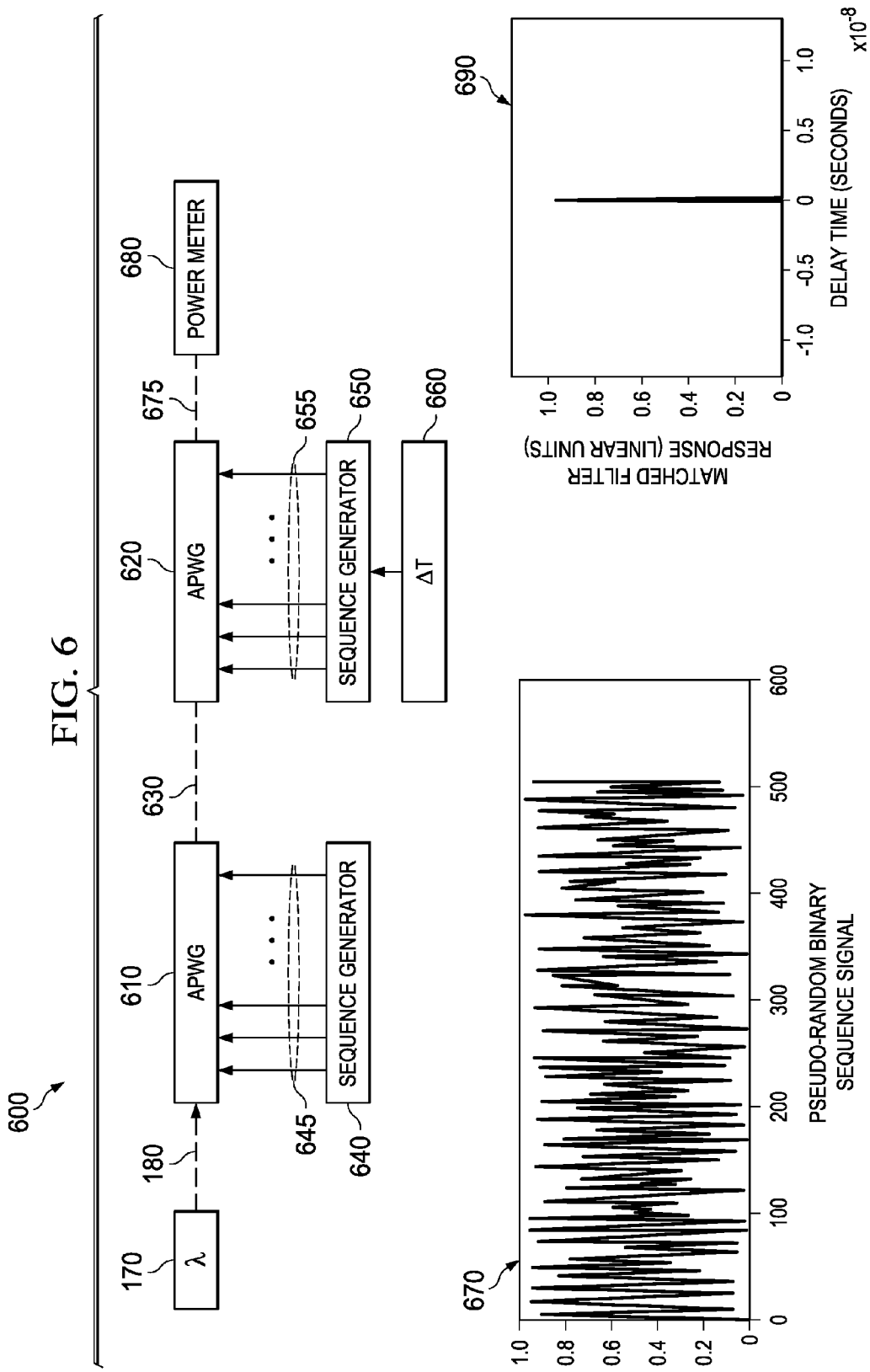
FIG. 6 illustrates an embodiment of the disclosure of a matched-phase filter utilizing an APWG.

Turning now to FIG. 6, illustrated is an embodiment of a phase matched filter 600. The filter 600 includes a first APWG 610 and a second APWG 620 coupled by an optical path 630. In various embodiments the first APWG 610 and the second APWG 620 are nominally identical within manufacturing tolerances, and in particular may each be configured to provide a nominally identical temporal phase shift pattern to an optical signal passing therethrough. The optical path 630 may include any medium that supports propagation of the input optical signal 180, including without limitation an optical waveguide, e.g. optical fiber, liquids, bio-materials, air and vacuum.

The first APWG 610 is controlled by a first sequence generator 640 via control signals 645. The second APWG 620 is controlled by a second sequence generator 650 via control signals 655. The first and second sequence generators 640, 650 are configurable to produce a sequence of bit patterns at outputs thereof. The voltage of the outputs may be individually or collectively scaled as necessary to form a desired phase shift on the input optical signal 180 corresponding to each output bit. A delay element 660 is configured to delay the control signals 655 relative to the control signals 645 by a time delay ΔT. In various embodiments the delay element 660 is a programmable or adjustable delay, while in other embodiments the delay element 660 is fixed.

In one embodiment, the first sequence generator 640 is configured to produce a temporal sequence of phase shifts on the input optical signal 180. In some embodiments the temporal sequence is formed using a pseudo-random binary sequence (PRBS), such as that exemplified by a PRBS 670, output by the first sequence generator 640. In such embodiments the phase of the signal output by the first APWG 610 will have a pseudo-random distribution of available phase states, as described above, with the number of available phase states being determined in part by a number n of control signals 645. In other embodiments, the temporal sequence is a linear FM (LFM) signal in any of its known forms. LFM may be used, e.g., in radar applications. In various embodiments the control signals 645 are controlled in binary fashion, yielding $2^n$ phase states. In other embodiments, the control signals are controlled by a number of states different than two. In one example the control signals 645 are controlled in ternary fashion, yielding $3^n$ phase states.

The second APWG 620 is configured to receive the optical signal output by the first APWG 610, after the output signal propagates via the optical path 630. In various embodiments, the phase shift produced on the propagated optical signal by the second APWG 620 is a time-delayed version of that produced by the first APWG 610. For example, the second sequence generator 650 may also be configured to produce a PRBS. In some embodiments, the second sequence generator 650 may be configured to output a same sequence of bit patterns as the first sequence generator 640, but delayed by the time delay ΔT.

When the phase shift produced by the first APWG 610 and the second APWG 620 is in response to a PRBS, in general the phase shift produced by the second APWG 620 will be uncorrelated with the phase shift produced by the first APWG 610. In such a case the phase shift produced by the second APWG 620 generally destructively interferes with the signal received from the optical path 630, resulting in little power in an output optical signal 675 output by the second APWG 620.

However, when the time delay ΔT produced by the delay element 660 is tuned such that a delayed temporal phase shift pattern applied by the second APWG 620 is aligned with a temporal phase shift pattern of the arriving signal applied by the first APWG 610, then the phase shift patterns are temporally correlated. In this event, the power of the output optical signal 675 is nonzero. Thus, when configured in this manner the first APWG 610 and the second APWG 620 act as a phase-matched filter. As mentioned previously, because the matching is based on phase and not amplitude, the SNR of the filtered signal, represented by the output optical signal 675, is generally high and, in particular, is superior to optical amplitude-matched filters.

In a non-limiting illustration, a power meter 680 configured to detect the output optical signal 675 may produce a power characteristic 690 with the delay of ΔT applied by the delay element 660 as a parameter. The detected power is characterized by a sharp peak and low noise floor. These characteristics are expected to result in improved performance of embodiments utilizing the phase-matched filter 600, such as, without limitation, Light Detection and Ranging (LIDAR) and optical communications based on CDMA.

Figure 7:
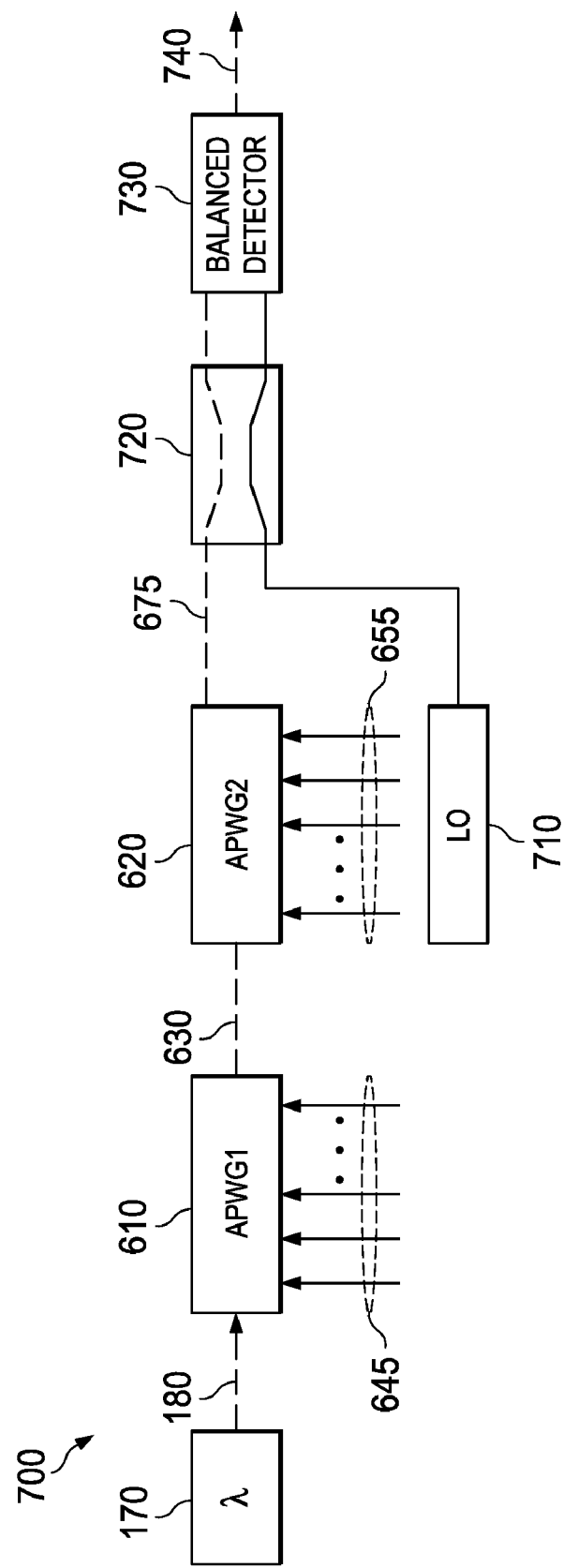
FIG. 7 illustrates an embodiment of the disclosure of a matched-phase filter with a local oscillator.

FIG. 7 illustrates an embodiment of a phase-matched filter 700 employing an optical local oscillator (LO) 710. In some cases it may be desirable to increase the power of the output optical signal 675, or to down-convert the output optical signal 675 for further signal processing. The output optical signal 675 and the LO 710 are input to a 4-port optical coupler 720. The outputs of the coupler 720 are coupled to inputs of a balanced detector 730. In one embodiment the LO 710 is configured to have a same frequency as the output optical signal 675, e.g., $\omega_c$. In this case, the LO 710 may constructively interfere with the output optical signal 675. By adjusting the power of the LO 710 or by increasing the gain of the balanced detector 730 the balanced detector may produce an output signal 740 that is an amplified version of the output optical signal 675.

In another embodiment the frequency of the output optical signal 675 is shifted by configuring the LO 710 to produce a signal with a frequency $\omega_{LO} \neq \omega_c$. The coupler 720 will then produce mixing products with frequencies at $\omega_{LO} \pm \omega_c$. In the case that the difference (lower) frequency output is desired the balanced detector 730 may be configured to select the signal at $\omega_{LO} - \omega_c$ for output by the output signal 740.

Figure 8A:
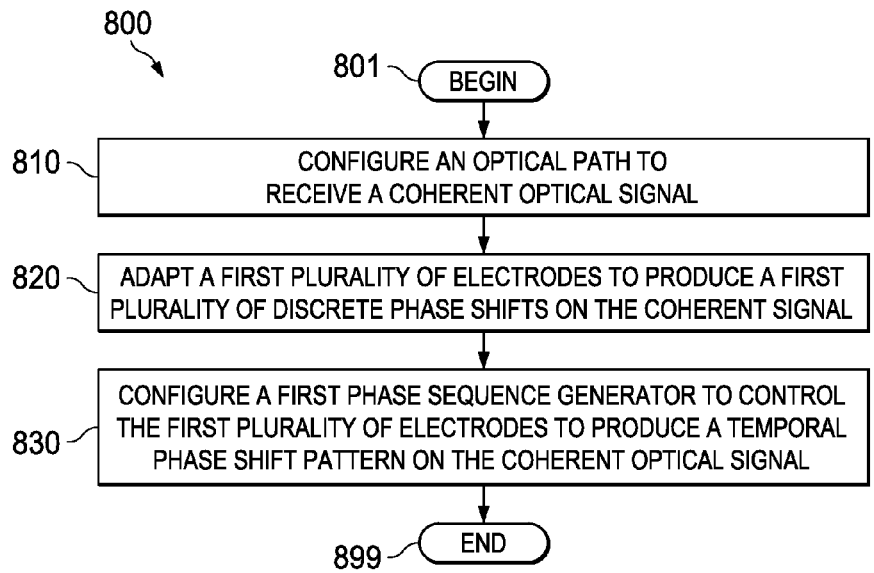
FIGS. 8A and 8B illustrate methods of the disclosure.

Moving now to FIG. 8A, a method generally designated 800 is provided. The method 800 may be used, e.g., to form a phase-matched optical filter. The method begins with a begin state 801. In a step 810, an optical path is configured to receive a coherent optical signal. In a step 820, a first plurality of electrodes are adapted to produce a first plurality of discrete phase shifts on the coherent signal. The phase shifts may be applied such that an output optical signal is phase-shifted with respect to the input optical signal by a sum of the plurality of discrete phase shifts. In a step 830, a first phase sequence generator is configured to control the first plurality of electrodes to produce a temporal phase shift pattern on the coherent optical signal. The method 800 ends with an end state 899.

Figure 8B:
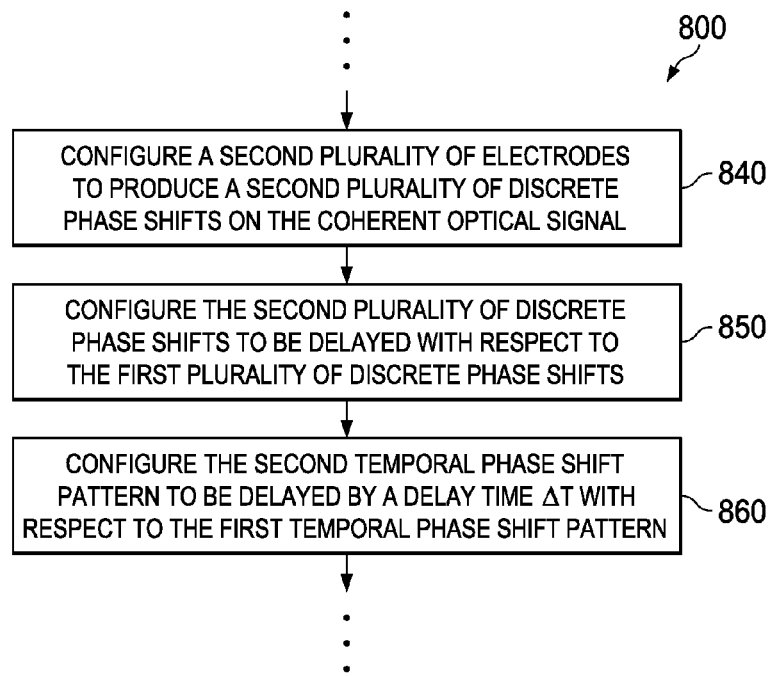

FIG. 8B illustrates additional steps of the method 800 that may be performed in various embodiments. In a step 840, a second plurality of electrodes are configured to produce a second plurality of discrete phase shifts on the coherent optical signal. Optionally, the first temporal phase shift pattern and the second temporal phase shift pattern are a same temporal phase shift pattern. In a step 850, the second plurality of discrete phase shifts are configured to be delayed with respect to the first plurality of phase shifts. A second phase sequence generator may be used to control the second plurality of electrodes, e.g. In a step 860, the second temporal phase shift pattern is configured to be delayed by a delay time ΔT with respect to the first temporal phase shift pattern. Optionally, the delay time ΔT is a value that results in a temporal correlation between the second temporal phase shift pattern and the first temporal phase shift pattern.

Those skilled in the art to which this application relates will appreciate that other and further additions, deletions, substitutions and modifications may be made to the described embodiments.

What is claimed is:

1. An apparatus, comprising:
    an optical path configured to propagate an input optical signal;
    a plurality of electrodes configured to produce a plurality of discrete temporal phase shifts on said input optical signal, such that an output optical signal is phase-shifted with respect to said input optical signal by a sum of said plurality of discrete temporal phase shifts,
    wherein at least on temporal phase shift has a delay time with respect to another temporal phase shift.

2. The apparatus as recited in claim 1, wherein a first of said plurality of electrodes is configured to produce a first phase shift and a second of said plurality of electrodes is configured to produce a second phase shift that is about twice said first phase shift.

3. The apparatus as recited in claim 1, wherein said plurality of electrodes includes at least six electrodes.

4. The apparatus as recited in claim 1, wherein said plurality of electrodes are configured such that said sum has a maximum value less than about $2\pi$ radians.

5. The apparatus as recited in claim 1, wherein each of said electrodes is associated with one of a respective plurality of portions of said optical path, each optical path portion having a different length.

6. The apparatus as recited in claim 5, wherein said each optical path portion has a length that is about twice as long as a path length of a next shorter optical path portion.

7. The apparatus as recited in claim 1, wherein said plurality of electrodes includes n electrodes configured to shift a phase of said input optical signal by any of $2^n$ different phase shift values.

8. The apparatus as recited in claim 7, wherein an incremental phase shift between any two subsequent phase shift values is about $\pi/2^{n-1}$ radians.

9. A photonic matched filter, comprising:
a first optical arbitrary phase waveform generator adapted to accept a coherent light signal and apply a first temporal phase shift pattern thereto;
a second optical arbitrary phase waveform generator configurable to receive an output signal of said first optical arbitrary phase waveform generator and apply a second temporal phase shift pattern thereto; and
a propagation path configured to propagate said coherent light signal from an output of said first waveform generator to an input of said second waveform generator.

10. The photonic matched filter as recited in claim 9, wherein said propagation path includes a free-space path.

11. The photonic matched filter as recited in claim 9, wherein said first and second temporal phase shift patterns are a same temporal phase shift pattern.

12. The photonic matched filter as recited in claim 9, wherein said first and second temporal phase shift patterns include a pseudo-random sequence of phase shift values.

13. The photonic matched filter as recited in claim 9, wherein said first and second optical arbitrary phase waveform generators each include a plurality of electrodes associated with a corresponding plurality of optical path portions, each optical path portion having a length that is about twice as long as an optical path portion length of a next shorter optical path portion.

14. The photonic matched filter as recited in claim 9, wherein said first optical arbitrary phase waveform generator includes at least six electrodes configured to apply said first temporal phase shift pattern, and said second optical arbitrary phase waveform generator includes at least six electrodes configured to apply said second temporal phase shift pattern.

15. The photonic matched filter as recited in claim 9, wherein said first and said second optical arbitrary phase waveform generators are each configured to produce $2^n$ unique phase shifts values, where n is a number of electrodes configured to change a phase of said coherent light signal.

16. The photonic matched filter as recited in claim 15, wherein an incremental phase shift between any two subsequent phase shift values is about $\pi/2^{n-1}$ radians.

17. A method, comprising:
configuring an optical path to receive a coherent optical signal;
adapting a first plurality of electrodes to produce a first plurality of discrete phase shifts on said coherent signal, such that an output optical signal is phase-shifted with respect to said coherent optical signal by a sum of said plurality of discrete phase shifts; and
configuring a first phase sequence generator to control said first plurality of electrodes to produce a first temporal phase shift pattern on said coherent optical signal.

18. The method as recited in claim 17, further comprising providing a second plurality of electrodes configured to produce a second plurality of discrete phase shifts on said coherent optical signal and configuring a second phase sequence generator to control said second plurality of electrodes to produce a second temporal phase shift pattern on said coherent optical signal.

19. The method as recited in claim 18, wherein said second temporal phase shift pattern is delayed by a delay time with respect to said first temporal phase shift pattern.

20. The method as recited in claim 19, wherein said delay time is a value that results in a temporal correlation between said second temporal phase shift pattern and said first temporal phase shift pattern.

21. The method as recited in claim 18, wherein said first temporal phase shift pattern and said second temporal phase shift pattern are a same temporal phase shift pattern.

* * * * *